United States Patent [19]
Pecor

[11] Patent Number: 4,777,910
[45] Date of Patent: Oct. 18, 1988

[54] ANIMAL EXERCISING DEVICE

[76] Inventor: Francis H. Pecor, 404 Watkins Rd., Greenville, S.C. 29611

[21] Appl. No.: 24,823

[22] Filed: Feb. 12, 1987

[51] Int. Cl.$^4$ ............................................. A01K 29/00
[52] U.S. Cl. ..................................... 119/1; 119/102
[58] Field of Search .................... 119/1, 29, 96, 102; 128/25 R, 25 B, 80 G; 272/73

[56] References Cited

U.S. PATENT DOCUMENTS

| | | | |
|---|---|---|---|
| 2,261,355 | 11/1941 | Flynn | 128/25 |
| 2,546,726 | 3/1951 | Creamer, Jr. | 119/1 |
| 2,976,840 | 3/1961 | Hugus | 119/1 |
| 3,215,117 | 11/1965 | Short | 119/1 |
| 3,406,661 | 10/1968 | Parkes | 119/1 |
| 3,503,387 | 3/1970 | McAllister | 128/25 |
| 4,284,157 | 8/1981 | Lay | 180/65 R |
| 4,375,203 | 3/1983 | Parkes | 119/1 |
| 4,478,213 | 10/1984 | Redding | 128/25 R |
| 4,528,944 | 7/1985 | Reed et al. | 119/29 |
| 4,557,257 | 12/1985 | Fernandez et al. | 128/80 |
| 4,572,501 | 2/1986 | Durham et al. | 128/25 R |

*Primary Examiner*—John J. Wilson
*Attorney, Agent, or Firm*—Dority & Manning

[57] ABSTRACT

An animal exercising device for exercising an exercisable pair of legs of an animal as the animal walks across a surface. The animal exercising device comprises a frame structure positionable about the rear quarter of the animal, the frame structure including elastic rings for suspending the rear end of the animal therefrom. The rear legs of the animal are inserted into boots which are attached to crank arms. The crank arms are attached to wheels which rotate upon walking movement of the front legs of the animal. Upon walking movement of the front legs of the animal, the rear pair of legs attached to the crank arms are oscillated upwardly and downwardly by the crank arms for passively exercising the rear legs of the animal.

13 Claims, 1 Drawing Sheet

ANIMAL EXERCISING DEVICE

BACKGROUND OF THE INVENTION

The present invention relates to an animal exercising device which oscillates upwardly and downwardly one pair of legs of the animal as the other pair of legs of the animal performs normal walking movements.

Animals which are commonly kept as pets, such as dogs, cats and the like are typically very active. For such animals to be maintained in peak physical condition, most require a great deal of exercise. However, due to certain injuries, diseases, and old age, the rear pair of legs of an animal may become incapacitated and thus not receive adequate exercise during the normal course of activity of the animal. Such a condition prevents the rear quarter of the animal, which includes one of the major muscle groups of the animal, from being actively stimulated, thus resulting in diminished overall well-being and physical conditioning of the animal.

Various devices have been patented for accommodating animals having a crippled rear leg or otherwise disabled rear quarter. One such device is disclosed in U.S. Pat. No. 3,406,661, granted to Parkes, entitled, "Mobile Suspensory Apparatus For Crippled Household Animals", which sets forth a wheeled frame structure that stationarily supports the rear quarter of an animal as the animal propels itself about through use of its front legs. Another similar device is disclosed in U.S. Pat. No. 4,375,203, also granted to Parkes, entitled, "Prosthetic Cart for Animals", which sets forth a wheeled frame structure having hip and leg supports for stationarily supporting the rear quarter of an animal as the animal performs walking movements with its front legs. U.S. Pat. No. 4,528,944, granted to Reed et al., entitled, "Animal Exercising Harness", discloses a device for exercising the legs of a healthy animal which includes a chest harness having a pulley for receiving cables attached to the rear legs of the animal for causing tension to be applied between the rear legs and the chest of the animal when the animal is walking or running.

SUMMARY OF THE INVENTION

It is therefore an object of the present invention to provide an animal exercising device which allows for the transport of a disabled pair of legs of an animal upon walking movement of the other legs of the animal.

Another object of the present invention is to provide an animal exercising device which exercises a disabled pair of legs of an animal upon walking movement of the other pair of legs of the animal.

Yet another object of the present invention is to provide an animal exercising device which both transports and exercises a disabled pair of legs of an animal upon walking movement of the other pair of legs of the animal.

Still another object of the present invention is to provide an animal exercising device which may be readily and securely adjusted to the dimensions of a particular animal.

Generally, these and other objects are accomplished by the present invention, one embodiment of which comprises an animal exercising device for exercising an exercisable pair of legs of an animal as the animal walks across a surface. The animal exercising device comprises a frame structure positionable about the body of the animal, oscillation means connected to the frame structure and adapted for oscillating the exercisable pair of legs of the animal upwardly and downwardly, and attachment means connected to the oscillation means. The attachment means are adapted for attaching the oscillation means to the exercisable pair of legs of the animal, such that upon the attaching of the exercisable pair of legs of the animal to the oscillation means and upon walking movement of the animal, the exercisable pair of legs of the animal attached to the oscillation means are oscillated upwardly and downwardly by the oscillation means.

More specifically, the animal exercising device of the present invention may include oscillation means having a pair of rotatable wheels, each of the pair of rotatable wheels being receivable on either side of the rear end of the animal, the pair of rotatable wheels being for frictional engagement with the surface for rotation relative thereto. A pair of hub assemblies are provided, each of the pair of hub assemblies being connected proximate the center of each of the pair of rotatable wheels. Also provided are a pair of crank arms, each of the pair of crank arms being connected to and extending outwardly from each of the pair of hub assemblies for rotation with each of the pair of rotatable wheels. The pair of crank arms are movable to an out of phase relationship with respect to one another to allow an out of phase oscillation of each of the rear pair of legs with respect to one another. A pair of receptacles are provided which are connected for movement with the oscillation means, each of the pair of receptacles being adapted for receipt of a lower end of each of the exercisable pair of legs of the animal.

BRIEF DESCRIPTION OF THE DRAWINGS

The foregoing as well as other objects of the present invention will be more apparent from the following detailed description of the preferred embodiment of the invention when taken together with the accompanying drawings, in which.

DESCRIPTION OF THE PREFERRED EMBODIMENT

Figure 1:
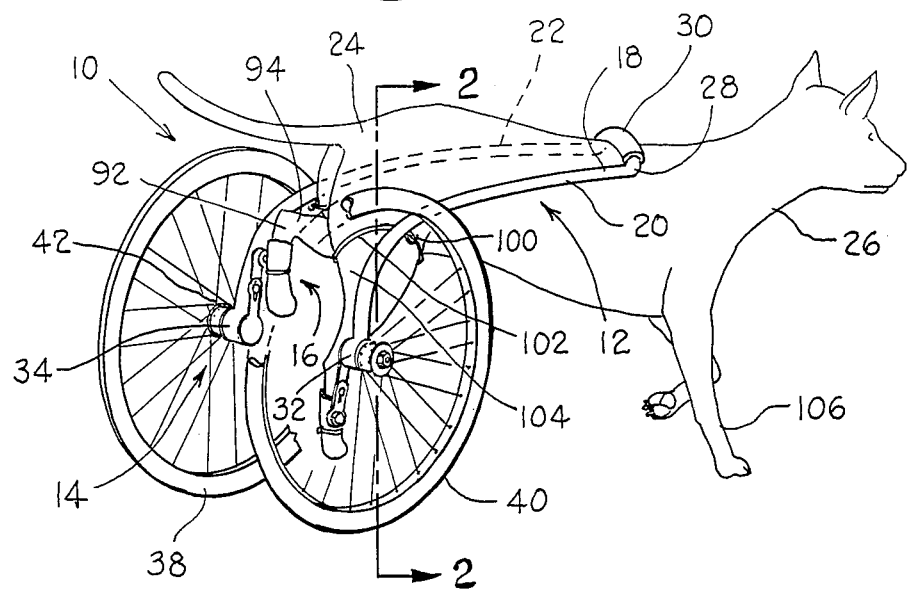
FIG. 1 is a perspective view of a preferred form of an animal exercising device constructed in accordance with the present invention.

Referring to the drawings in detail, wherein like reference characters represent like elements throughout the various views, the animal exercising device of the present invention is designated generally in FIG. 1 by the reference character 10. Animal exercising device 10 includes a frame structure, generally 12, oscillation assemblies, generally 14, and leg attachment assemblies, generally 16.

Frame structure 12 is preferably constructed of steel, although any other suitable material could be used, and includes a unitary tubular member 18 which is of a generally U-shape. Unitary tubular member 18 includes side portions 20, 22 which are spaced apart for receiving the rear quarter 24 of the animal 26 therebetween. Side portions 20, 22 terminate at a lateral brace portion 28 which crosses over a forward portion of the back of animal 26. Lateral brace portion 28 is provided with a protective cushion 30, preferably constructed of foam rubber, which rests directly on the back of animal 26, thereby making the resting of lateral brace portion 28 on animal 26 more comfortable. Side portions 20, 22 curve downwardly from lateral brace portion 28 and terminate into hub receivers 32, 34. Hub receivers 32, 34 are generally cylindrical in shape and include a generally cylindrical bore 36.

Figure 2:
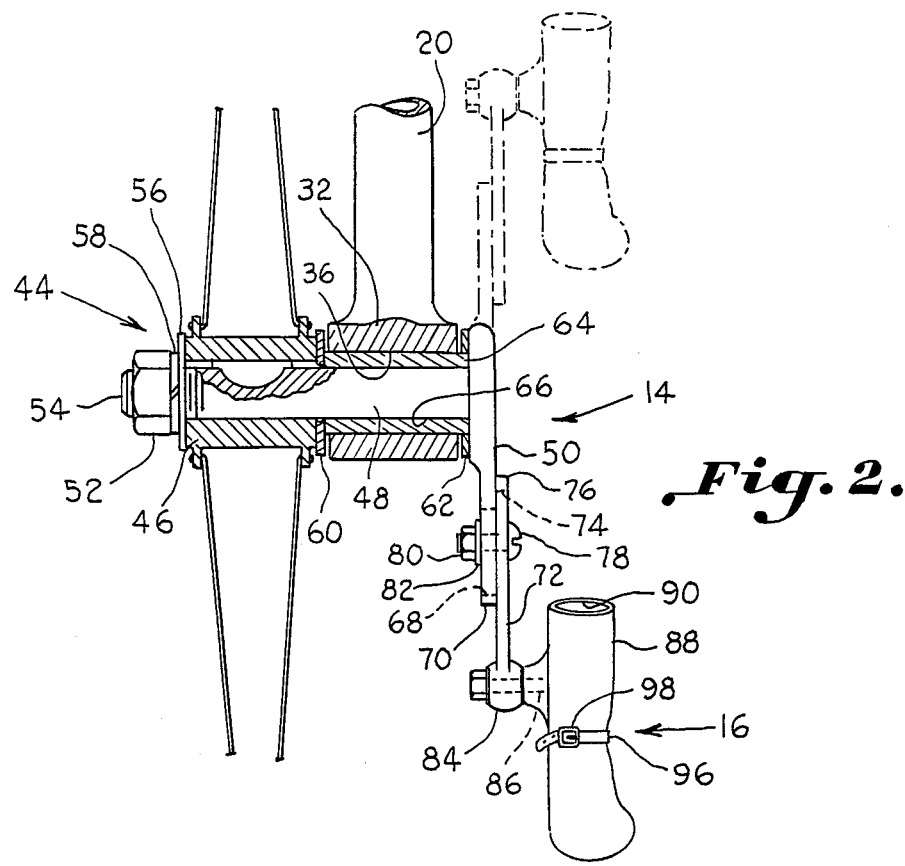
FIG. 2 is a sectional view, with parts cut away, along lines 2—2 of FIG. 1.

Oscillation assemblies 14 include wheels 38, 40 which are spaceable to either side of rear quarter 24 of animal 26. Wheels 38, 40 could be spoked bicycle wheels or wheels of any other suitable design and/or construction. The center 42 of each wheel 38, 40 includes a hub assembly, generally 44. As shown in FIG. 2, each hub assembly 44 includes a cylindrical sleeve member 46 having a rotatable threaded shaft 48 received therein and extending outwardly therefrom. Threaded shaft 48 extends through hub receivers 32 of frame structure 12 and terminates into a perpendicularly extending crank arm 50. A bolt 52 is provided on an end 54 of threaded shaft 48 and serves to retain the oscillation assembly 14 together. A washer 56 and lock washer 58 are provided between bolt 52 and cylindrical sleeve member 46. A washer 60 is provided between cylindrical sleeve member 46 and hub receiver 32, and a washer 62 is provided between hub receiver 32 and crank arm 50. Bore 36 of hub receiver 32 is provided a bushing 64, preferably bronze, for receiving for rotation a cylindrical surface portion 66 of threaded shaft 48.

Crank arm 50 includes a slot 68 in a distal end 70 thereof. Attached to distal end 70 of crank arm 50 is an adjustable adaptor arm 72 having a slot 74 adjacent an end 76 thereof. Slots 68, 74 receive a screw or bolt 78 which extends therethrough and which has a nut 80 attached at one end thereof. A washer 82 is provided between nut 80 and crank arm 50. Bolt 78 and nut 80 are shown for illustrative purposes as means for attaching adaptor arm 72 to crank arm 50, and it is to be understood that various other fasteners and fastening configurations could be used to fixedly attach adaptor arm 72 to crank arm 50.

Provided in an opposite end of adaptor arm 72 is a bearing assembly 84, which preferably utilizes ball bearings provided therein, for rotationally receiving a threaded shaft 86.

Each leg attachment assembly 16 includes a boot 88 having an opening 90 for receiving a lower leg portion 92 of each rear leg 94 of animal 26. Boot 88 is preferably constructed of a soft plyable plastic, although any other suitable material can be used. A strap assembly 96 having buckle 98 may be provided boot 88 for compressing same against lower leg portion 92 to retain lower leg portion 92 snugly within boot 88. Boot 88 is freely rotatable relative to adaptor arm 72 and crank arm 50 through rotational engagement of threaded shaft 86 with bearing assembly 84.

Each leg attachment assembly 16 also includes, as shown in FIG. 1, a hook 100 provided on each side portion 20, 22 of frame structure 12 for receiving an elastic O-ring 102 thereon. O-rings 102 are preferably constructed of rubber or some other suitable elastic material and receive upper leg portions 104 to suspend rear quarter 24 of animal 26 from frame structure 12, thereby relieving rear legs 94 of support of rear quarter 24 by crank arms 50.

In using animal exercising device 10, rear legs 94 of animal 26 are first inserted through O-rings 102 such that rear quarter 24 is suspendable from frame structure 12 by O-rings 102. Lower leg portions 92 are inserted into boots 88 for snug retainment thereby. Strap assemblies 96 may be used to compress boots 88 against lower leg portions 92 to further ensure that rear legs 94 are snugly retained in boots 88. Once rear legs 94 are securely retained in animal exercising device 10, one of the wheels 38, 40 is rotated such that crank arms 50 are approximately 180° out of phase with respect to one another. This causes one of rear legs 94 to be fully extended downwardly while the other of the rear legs 94 is at an uppermost position. As animal 26 is then allowed to move forward using normal walking movements with front legs 106, which causes wheels 38, 40 to rotate, rear legs 94 are passively oscillated upwardly and downwardly by crank arms 50 due to the rotation of wheels 38, 40, thereby exercising the muscles of rear legs 94 and rear quarter 24.

Animal exercising device 10 is adjustable for a variety of different sized animals in that adaptor arms 72 are adjustable about crank arm 50 with bolt 78 and slots 68, 74, thereby allowing for animal exercising device 10 to be used by animals of various heights and leg lengths.

As an animal attached to animal exercising device 10 moves forward under normal walking movement, the rear quarter thereof is not only supported off the ground by frame 12, but is also exercised by crank arms 50. Animal exercising device 10 could be modified to accommodate animals having disabled front legs and healthy rear legs wherein the disabled front legs would be attached to the crank arms and the healthy rear legs would propel the animal through normal walking movement thereof.

While a preferred embodiment of the invention has been described using specific terms, such description is for illustrative purposes only, and it is to be understood that changes and variations may be made without departing from the spirit or the scope of the following claims.

What is claimed is:

1. An animal exercising device for exercising a given pair of legs of a four-legged animal as the animal walks across a surface motivated generally with the power of the other pair of legs thereof, comprising:
   (a) a frame structure positionable about the body of the animal, and having means for supporting the rear end of said animal generally adjacent said given pair of legs thereof;
   (b) a pair of wheels rotatably mounted on said frame structure for supporting said frame structure and for frictionally engaging the surface;
   (c) oscillation means, supported on said frame structure and connected to said wheels, for providing oscillation movement upon rotation of said wheels over the surface under the power of the animal's other pair of legs; and
   (d) means for attaching said given pair of legs of said animal to said oscillation means, whereby walking movement of the other pair of legs of said animal over the surface rotates said wheels so as to in turn oscillate and exercise said given pair of legs of said animal.

2. An animal exercising device as set forth in claim 1, wherein:
   said rotatable wheels are respectively disposed on either side of said animal; and
   said oscillation means includes a hub and fixedly associated rotatable shaft for each of said wheels, for rotation of the respective hub assembly relative said frame structure upon rotation of said wheels relative a surface.

3. An animal exercising device as set forth in claim 2, wherein said oscillation means further includes a respective crank arm connected to each of said shafts, said crank arms being out of phase with each other and connected to said attaching means for imparting out-of-phase oscillating motion to said given legs of said animal.

4. An animal exercising device as set forth in claim 1, further comprising:
   means associated with said oscillation means for allowing oscillation of the exercisable pair of legs of the animal in an out of phase relationship.

5. An animal exercising device as set forth in claim 1, wherein said frame structure comprises:
   means for disposing said oscillation means on either side of the animal; and
   a contact member for contacting the animal to allow support of said frame structure by the animal.

6. An animal exercising device as set forth in claim 1, wherein said frame structure comprises:
   means connectable to said frame structure for suspending one end of the animal from said frame structure.

7. An animal exercising device as set forth in claim 5, wherein said means for suspending one end of the animal from said frame structure includes two elastic O-rings, each being adapted for attachment to an upper portion of each of the exercisable pair of legs of the animal for supporting one end of the animal from said frame structure.

8. An animal exercising device as set forth in claim 1, wherein said attachment means includes:
   a pair of receptacles connected for movement with said oscillation means, each of said pair of receptacles being adapted for receipt of a lower end of each of the exercisable pair of legs of the animal.

9. An animal exercising device for exercising a rear pair of legs of an animal as the animal walks across a surface, the animal exercising device comprising:
   a frame structure positionable about the rear end of the animal;
   oscillation means connected to said frame structure and adapted for oscillating the rear pair of legs of the animal upwardly and downwardly, said oscillation means including:
      a pair of rotatable wheels, each of said pair of rotatable wheels being receivable on either side of the rear end of the animal, said pair of rotatable wheels being for frictional engagement with the surface for rotation relative thereto;
      a pair of hub assemblies, each of said pair of hub assemblies connected proximate the center of each of said pair of said rotatable wheels; and
      a pair of crank arms, each of said pair of crank arms connected to and extending outwardly from each of said pair of hub assemblies for rotation with each of said pair of wheels, said pair of crank arms being movable to an out of phase relationship with respect to one another to allow an out of phase oscillation of each of the rear pair of legs of the animal with respect to one another; and
   attachment means connected to said oscillation means and adapted for attaching said oscillation means to the rear pair of legs of the animal, said attachment means including a pair of receptacles connected for movement with said oscillation means, each of said pair of receptacles being adapted for receipt of a lower end of each leg of the rear pair of legs of the animal, such that upon receipt of the rear pair of legs of the animal in said pair of receptacles and upon walking movement of the animal, the rear pair of legs of the animal are oscillatable upwardly and downwardly by said oscillation means.

10. An animal exercising device as set forth in claim 9, wherein said frame structure comprises:
    means for disposing said oscillation means on either side of the rear end of the animal; and
    a contact member for contacting the animal to allow support of said frame structure by the animal.

11. An animal exercising device as set forth in claim 9, wherein said frame structure comprises:
    means connectable to said frame structure for suspending the rear end of the animal from said frame structure.

12. An animal exercising device for exercising a rear pair of legs of an animal as the animal walks across a surface, the animal exercising device comprising:
    a frame structure positionable about the body of the animal, said frame structure including means for suspending the rear end of the animal from the frame structure;
    oscillation means connected to said frame structure and adapted for oscillating the rear pair of legs of the animal upwardly and downwardly, said oscillation means including a pair of rotatable wheels, each of said pair of rotatable wheels being receivable on either side of the rear end of the animal, said pair of rotatable wheels being for frictional engagement with the surface for rotation relative thereto, and crank arm means connected to each of said pair of rotatable wheels for allowing an out of phase oscillation of each of the rear pair of legs of the animal with respect to one another; and
    attachment means connectable to said oscillation means, said attachment means including a pair of receptacles connected for movement with said oscillation means, each of said pair of receptacles being adapted for receipt of a lower end of each of the rear pair of legs of the animal, such that upon the attaching of the rear pair of legs of the animal to said oscillation means and upon walking movement of the animal, the rear pair of legs of the animal are oscillatable upwardly and downwardly by said oscillation means.

13. An animal exercising device as set forth in claim 12, wherein said frame structure comprises:
    means connectable to said frame structure for suspending the rear end of the animal from said frame structure.

* * * * *